US009559975B1

(12) United States Patent
Chen et al.

(10) Patent No.: US 9,559,975 B1
(45) Date of Patent: Jan. 31, 2017

(54) REAL-TIME ANALYSIS OF QUALITY OF SERVICE FOR MULTIMEDIA TRAFFIC IN A LOCAL AREA NETWORK

(71) Applicant: WESTERN DIGITAL TECHNOLOGIES, INC., Irvine, CA (US)

(72) Inventors: Paul Chen, Irvine, CA (US); Derek Cha, Irvine, CA (US)

(73) Assignee: Western Digital Technologies, Inc., Irvine, CA (US)

(*) Notice: Subject to any disclaimer, the term of this patent is extended or adjusted under 35 U.S.C. 154(b) by 72 days.

(21) Appl. No.: 13/631,970

(22) Filed: Sep. 29, 2012

(51) Int. Cl.
  *H04L 12/26* (2006.01)
  *H04L 12/863* (2013.01)
(52) U.S. Cl.
  CPC .................. *H04L 47/6215* (2013.01)
(58) Field of Classification Search
  CPC ......... G06F 15/173; H04L 12/28; H04L 12/56
  See application file for complete search history.

(56) References Cited

U.S. PATENT DOCUMENTS

| 6,499,054 | B1 | 12/2002 | Hesselink et al. |
| 6,594,268 | B1 | 7/2003 | Aukia et al. |
| 6,732,158 | B1 | 5/2004 | Hesselink et al. |
| 6,801,530 | B1 | 10/2004 | Brandt |
| 6,968,374 | B2 | 11/2005 | Lemieux et al. |
| 7,120,692 | B2 | 10/2006 | Hesselink et al. |
| 7,454,443 | B2 | 11/2008 | Ram et al. |
| 7,467,187 | B2 | 12/2008 | Hesselink et al. |
| 7,492,713 | B1 | 2/2009 | Turner et al. |
| 7,546,353 | B2 | 6/2009 | Hesselink et al. |
| 7,587,467 | B2 | 9/2009 | Hesselink et al. |
| 7,600,036 | B2 | 10/2009 | Hesselink et al. |
| 7,636,305 | B1 | 12/2009 | Taylor |
| 7,788,404 | B2 | 8/2010 | Hesselink et al. |
| 7,869,352 | B1 | 1/2011 | Turner |
| 7,917,628 | B2 | 3/2011 | Hesselink et al. |
| 7,934,251 | B2 | 4/2011 | Hesselink et al. |
| 7,949,564 | B1 | 5/2011 | Hughes et al. |
| 8,004,791 | B2 | 8/2011 | Szeremeta et al. |
| 8,144,587 | B2 | 3/2012 | Heinz |
| 8,255,661 | B2 | 8/2012 | Karr et al. |
| 8,285,965 | B2 | 10/2012 | Karr et al. |
| 8,341,117 | B2 | 12/2012 | Ram et al. |
| 8,341,275 | B1 | 12/2012 | Hesselink et al. |
| 8,352,567 | B2 | 1/2013 | Hesselink et al. |

(Continued)

OTHER PUBLICATIONS

Final Office Action dated Feb. 13, 2015 from U.S. Appl. No. 13/631,967, 27 pages.

(Continued)

*Primary Examiner* — Anez Ebrahim

(57) ABSTRACT

The embodiments relate to quality of service (QOS) features for a router, especially a router used in a home network or local area network. In the embodiments, the router is enhanced to be capable of measuring, detecting traffic sessions, and analyzing traffic in real time. The real-time analysis identifies traffic sessions in the data traffic and provides QOS to the traffic sessions. The QOS features are autonomous and do not require user configuration or intervention. In some embodiments, the real-time analysis and QOS features are triggered during periods of congestion.

20 Claims, 8 Drawing Sheets

(56) References Cited

U.S. PATENT DOCUMENTS

| | | |
|---|---|---|
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 8,713,265 B1 | 4/2014 | Rutledge |
| 8,762,682 B1 | 6/2014 | Stevens |
| 8,780,004 B1 | 7/2014 | Chin |
| 8,793,374 B2 | 7/2014 | Hesselink et al. |
| 8,797,872 B1 * | 8/2014 | Lambi ............... H04N 21/23113 370/230.1 |
| 8,819,443 B2 | 8/2014 | Lin |
| 2003/0058805 A1 | 3/2003 | Meyerson et al. |
| 2004/0092278 A1 * | 5/2004 | Diepstraten ......... H04L 12/5693 455/512 |
| 2005/0144195 A1 | 6/2005 | Hesselink et al. |
| 2005/0144200 A1 | 6/2005 | Hesselink et al. |
| 2005/0182833 A1 * | 8/2005 | Duffie ................. H04L 12/5693 709/224 |
| 2006/0002354 A1 | 1/2006 | Kang et al. |
| 2006/0133418 A1 | 6/2006 | Anand |
| 2006/0146702 A1 | 7/2006 | Hart et al. |
| 2006/0187942 A1 | 8/2006 | Mizutani et al. |
| 2007/0003029 A1 | 1/2007 | Vesterinen |
| 2007/0133468 A1 * | 6/2007 | Hara ............................ 370/331 |
| 2008/0049753 A1 | 2/2008 | Heinz |
| 2009/0067328 A1 * | 3/2009 | Morris ............. H04W 72/1242 370/230.1 |
| 2009/0225746 A1 | 9/2009 | Jackson et al. |
| 2009/0323524 A1 * | 12/2009 | Kuhn ............................ 370/230 |
| 2010/0036903 A1 | 2/2010 | Ahmad et al. |
| 2010/0220593 A1 | 9/2010 | Fujiwara et al. |
| 2012/0036041 A1 | 2/2012 | Hesselink |
| 2013/0212401 A1 | 8/2013 | Lin |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2013/0309991 A1 | 11/2013 | Shaw |
| 2014/0095439 A1 | 4/2014 | Ram |
| 2014/0169921 A1 | 6/2014 | Carey |
| 2014/0173215 A1 | 6/2014 | Lin et al. |

OTHER PUBLICATIONS

Office Action dated Jun. 16, 2015 from U.S. Appl. No. 13/631,967, 16 pages.
Final Office Action dated from U.S. Appl. No. 13/631,967, 19 pages.
Final Office Action dated Jan. 4, 2016 from U.S. Appl. No. 13/631,967, 19 pages.
Office Action dated Jun. 4, 2014 from U.S. Appl. No. 13/631,965, 36 pages.
Final Office Action dated Sep. 26, 2014 from U.S. Appl. No. 13/631,965, 34 pages.
Office Action dated Jun. 5, 2014 from U.S. Appl. No. 13/631,967, 19 pages.

* cited by examiner

REAL-TIME ANALYSIS OF QUALITY OF SERVICE FOR MULTIMEDIA TRAFFIC IN A LOCAL AREA NETWORK

CROSS-REFERENCE TO RELATED APPLICATIONS

The present application is related to U.S. patent application Ser. No. 13/631,965, entitled "SESSION-BASED QUALITY OF SERVICE FOR MULTIMEDIA TRAFFIC IN A LOCAL AREA NETWORK," filed Sep. 29, 2012, and U.S. patent application Ser. No. 13/631,967, entitled "METHODS AND SYSTEMS FOR CONFIGURING AND UPDATING SESSION-BASED QUALITY OF SERVICE FOR MULTIMEDIA TRAFFIC IN A LOCAL AREA NETWORK," filed Sep. 29, 2012, which are herein incorporated by reference in their entirety.

BACKGROUND

The popularity of the Internet has caused the emergence and increased use of network-accessible devices in all locations. Users now access and employ multiple devices wherever they go. As a result, small office, home/residential networks have become complex and grown in the number of client devices serviced.

A typical home network comprises a modem interfacing an Internet Service Provider ("ISP") and a router. Commonly, this router also provides a wireless access point. In many homes, a wide variety of client devices are connected to the router, such as personal computers, printers, laptop computers, tablets, and smart phones. These devices may utilize any number of traffic services, such as video streaming, voice over IP, data uploads or downloads, web browsing, etc. These traffic services have different characteristics need to be serviced with different priorities to ensure an optimal quality of service ("QOS"). Therefore, a router in a home network must handle a complex and mixed traffic environment.

Although many home network routers ostensibly provide QOS features, these known products are difficult to configure and still provide poor QOS. Unfortunately, conventional home network routers have limited capabilities and processing, which limit their ability to provide adequate QOS features. It would be desirable to provide a router, especially for a home network or local area network that can easily provide QOS.

BRIEF DESCRIPTION OF THE DRAWINGS

Systems and methods which embody the various features of the invention will now be described with reference to the following drawings, in which.

DETAILED DESCRIPTION

Figure 1:
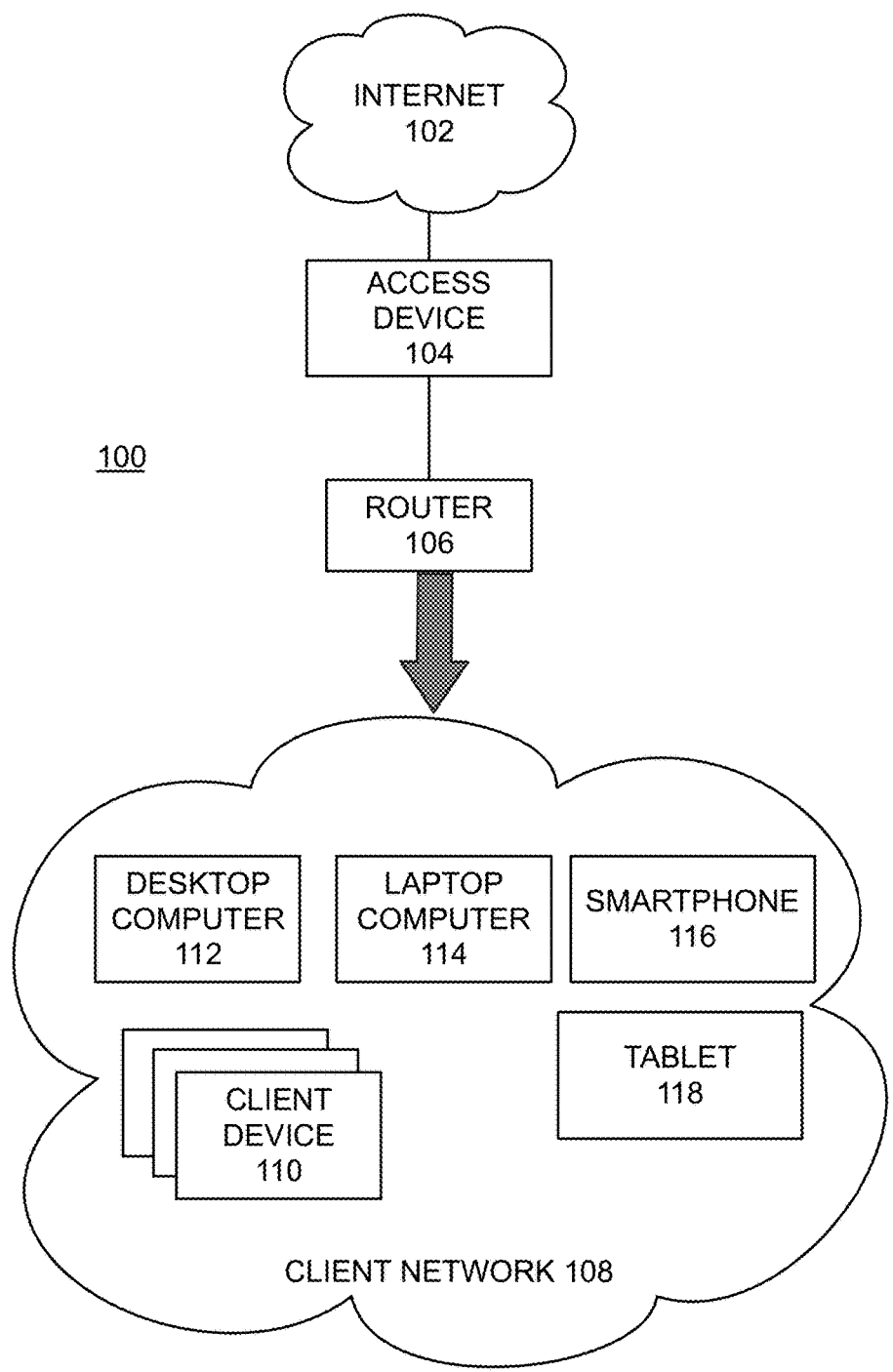
FIG. 1 shows an exemplary system in accordance with embodiments of the present invention.

The embodiments provide an enhanced router for a home network. In some embodiments, a home network may refer to any local area network that provides communications for client devices, such as personal computers, laptop computers, printers, smart phones, and tablets. In a home network, the router enables shared access to another network, such as a wide area network or the Internet. Typically, this access to the Internet is via a modem or other access device, such as digital subscriber line, broadband cable access, optical fiber, etc.

The router may provide various routing functions, such as network address translation, domain name services, firewall services, etc. The router may provide communications via wired connections, such as Ethernet, Fast Ethernet, Gigabit Ethernet, etc. In addition, the router may provide a wireless access point, such as a WiFi network.

In some embodiments, real-time analysis is utilized to (1) recognize traffic sessions in the data traffic and (2) provide session-based routing within a desired QOS for the traffic sessions. Unlike conventional packet classification, which examines a packet based on the information in its header, the real-time analysis of some of the embodiments recognizes traffic sessions in the data traffic based on recognizing patterns of packet flows. Of note, the various patterns of a traffic session can be recognized substantially independent of the packet's information. For example, in some embodiments, the real-time analysis recognizes a traffic session based on packet size, the timing or intervals of traffic between a source and destination, the bandwidth, the data rate, direction of the packet flows, etc. Thus, the real-time analysis enables QOS without relying upon conventional networking protocols, such as differentiated services, packet marking, etc.

In some embodiments, the real-time analysis and traffic session classification tracks each flow of packets in both directions from a device. Once a traffic session has been recognized, session-based routing monitors the state of each flow and also enables processing of each packet based on a context that has been established by prior packets that have passed through the device in both the upstream and downstream directions.

For example, in a video streaming, the traffic session will comprise a flow of packets for a video stream from a server destined to a client and a flow of one or more signaling packets, such as acknowledgments or signaling information, sent from the client back to the server. Typically, these packet flows of the traffic session will exhibit a pattern that can be recognized, especially with real-time analysis. Depending on the communications exchanged, the state of the video streaming traffic session will also vary. For example, the server may stream video at a higher or lower bandwidth depending on information provided in the acknowledgments and signaling flow received from the client. Therefore, a video stream traffic session will have distinct pattern and a state, which can be accordingly used by a router to ensure the QOS of the traffic session.

The session-based routing of the invention is a network routing technology that takes variations in the flow of data into account to increase routing efficiency. The increased efficiency helps avoid excessive latency and jitter, for example, for streaming data, such as voice over IP, video, etc.

Accordingly, rather than inspecting packets individually, the router recognizes and evaluates traffic sessions in real time. A traffic session refers to any set of communications between a source and destination for delivering a single traffic service. This concept permits the router to prioritize traffic, deliver desired quality of service to the traffic session, and keep flows from consuming excessive network resources in real time. In addition, the router can dynamically identify and adjust to any traffic session. In the embodiments, the router determines traffic sessions in real time, for example, based on an ID, route, and time of receipt and rate of flow, to maintain the quality of service for the traffic service.

In the embodiments, the session-based analysis is subject to a "real-time constraint," e.g. operational deadlines from event to router response. The time constraint may be on the order of milliseconds or microseconds. In contrast, conventional routers, even with QOS functions, are a non-real-time system and do not guarantee a response time.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

Exemplary System

FIG. 1 shows an exemplary system in accordance with embodiments of the present invention. As shown, a system 100 may comprise a wide area network 102, an access device 104, a router 106, and a client network 108. The client network 108 may further comprise various client devices 100. For example, as shown in FIG. 1, the client network 108 may comprise a desktop computer 112, a laptop computer 114, one or more smartphones 116, and a tablet 118. These components will now be further described below.

The wide area network 102 may be any communications infrastructure that spans a broad area, such as a region, country, etc. In some embodiments, the wide area network 102 may comprise the Internet. The wide area network 102 may be composed of various network elements, such as routers, switches, firewalls, etc. Such elements are well known to those skilled in the art. The wide area network 102 may support a variety of protocols, such as TCP/IP, ATM, etc. In general, data traffic is transported over the wide area network 102 and other networks in the form of packets, which are routed from their source to their destination.

In some embodiments, the wide area network 102 provides access to various information services, such as hypertext data available on the World Wide Web, via known protocols and applications. These information services may include, but are not limited to any form of multimedia, such as voice over Internet Protocol (VoIP), streaming services for audio and video, e-mail, instant messaging, and so forth. In order to deliver these information services, the data packets may be delivered within the context of one or more traffic sessions.

A traffic session refers to any set of communications between a source and destination for delivering a single traffic service. The embodiments permit the router to prioritize traffic, deliver desired quality of service to the traffic session, and keep flows from consuming excessive network resources. Traffic session analysis of the embodiments takes variations in the flow of data into account to increase routing efficiency. The increased efficiency helps avoid excessive latency and jitter, for example, for streaming data, such as voice over IP, video, etc.

For example, in a video streaming session, a traffic session will comprise a downstream flow of packets for a video stream from a server destined to a client and an upstream flow of one or more signaling packets, such as acknowledgments or signaling information, sent from the client back to the server. Depending on the communications exchanged, the state of the video streaming traffic session will vary. The server may stream video at a higher or lower bandwidth depending on information provided in the acknowledgments and signaling flow received from the client. Therefore, a traffic session will go through different states or phases and the flow of data will change according to the state of the traffic session.

The access device 104 serves as an interface for access to the wide area network 102. For example, the access device 104 may provide a wired connection to the wide area network 102 via a modem, a digital subscriber line modem, a cable modem, a powerline modem, an optical fiber modem, etc. Alternatively, the access device 104 may connect to the wide area network 102 via a wireless connection, such as 3G, 4G, WIFI, WiMax, connection. Any device that provides access to the wide area network 102 may be employed. In addition, the access device 104 may provide one or more communications interfaces, such as an Ethernet-based interface or Universal Serial Bus interface, for the router 106 or other devices.

In some embodiments, an Internet Service Provider provides the access device 104 as a separate device. Alternatively, the access device 104 may integrated or a component of the router 106.

The router 106 forwards data packets between the wide area network 102 and the client network 108. In general, the router 106 may comprise various network interfaces that are connected to either networks 102 and 108 and is configured to perform various routing functions. Typically, the router 106 receives data packets, inspects the packets, and internally forwards the data packets to an outbound interface. An exemplary structure and architecture of the router 106 is described further with reference to FIGS. 2 and 3.

In some embodiments, the router 106 is configured to provide QOS for certain traffic sessions in the data traffic. In particular, the router 106 is configured to route packets that are part of a traffic session on a session basis rather than on a packet-by-packet basis. Conventional routers typically inspect and classify packets individually without regard to their context. For example, a prior art router will simply classify or route each packet individually based only on information from the packet itself, such as its header. Accordingly, the prior art routers can only provide QOS using packet tagging or marking (such as differentiated services) or a bandwidth reservation protocol (such as integrated services). Unfortunately, either of these approaches requires coordinated operation among multiple network elements in both the wide area network 102 and the client network 108. Due to the wide variety of equipment and protocols used in TCP/IP and the Internet, such cooperation among network elements is extremely rare, if not impossible.

In contrast, in some embodiments, the router 106 utilizes session-based analysis. When using session-based analysis, the router 106 recognizes the presence of a traffic session within the data traffic passing between the wide area network 102 and client network 108. In one embodiment, the router 106 employs real-time analysis of the packets to identify traffic sessions that are present. For example, the router 106 may be programmed with various known types patterns of traffic sessions. In particular, traffic sessions may exhibit various patterns in the timing of packets, packet size, data rate, bandwidth utilized, packet sizes, direction of packet flows, etc. Of note, in some of the embodiments, these characteristics of the packets in the data traffic can be measured without having to inspect the contents of the packet's header. One example of the analysis for recognizing traffic sessions in the data traffic is provided with reference to FIGS. 3A and 3B.

When a traffic session is recognized, the router 106 may identify the traffic session based on information from the packets. For example, in one embodiment, the traffic sessions are identified based on their source IP address on the wide area network 102, a port number, a destination address on the client network 108, packet size, etc., alone or in combination.

Once identified, the router 106 may also record and maintain state information about a traffic session. The state information indicates the various phases of a traffic sessions, such as initiation, set-up, content delivery, signaling, session closing, etc. Thus, when subsequent packets for a traffic session are received, the router 106 is aware of the context of these packets and routes them accordingly. For example, the router 106 may immediately recognize a packet for a traffic session based on reading a media access control address, a destination IP address, a source IP address, a port number, etc. from the header. Rather than performing a route lookup, the router 106 forwards the packet based on the session's state information. This feature allows the router 106 to truncate or avoid the route lookup process, which can be processor intensive and time consuming.

As part of its session-based routing, the router 106 may limit traffic traveling upstream from the client network 108 to the wide area network 102 to a maximum threshold. This limit ensures that bandwidth has been reserved for upstream traffic for certain traffic sessions. In some embodiments, the router 106 limits the upstream traffic traveling through access device 104 to approximately 85-95% of the maximum bandwidth available. Alternatively, the router 106 may be configured to reserve a certain amount of upstream bandwidth, such as 5-15%.

As another part of its session-based routing, the router 106 may route packets based on their size. For example, the router 106 may initially check a packet's size to determine if it is below a threshold. In one embodiment, the router 106 is configured to check for packets that are less than 100 bytes. If the packet is small (e.g., less than the threshold), the router 106 may preferentially queue and forward these packets. This feature assists QOS because smaller sized packets are frequently used within a traffic session to signal bandwidth available, latency, state, etc. between the source and the destination of the traffic session. If this traffic is interrupted or slowed, the source or the destination of the traffic session may respond and negatively affect the QOS. Thus, in some embodiments, the router 106 may preferentially treat small packets for various traffic sessions to ensure their transit between the source and destination of the traffic session.

The router 106 may employ one or more its session-based routing features continuously or during selected periods. For example, when congestion is low or absent, the router 106 may simply employ conventional routing techniques on a packet-by-packet basis. During periods of congestion, however, the router 106 may enforce QOS using one or more of its session-based routing features. As noted, the structure and architecture of the router 106 and its session-based routing is described further with reference to FIGS. 2-3 below.

Referring now to FIG. 1, the local or client network 108 refers to any network that interconnects devices within a limited or small area, such as a home, an office, a building, etc. In some embodiments, the local area network 108 comprises wired and wireless connections to a plurality of client devices 110. For example, the client network 108 may be an Ethernet-based network. In addition, the client network 108 may comprise a WIFI network originating from router 106 or access device 104 as a wireless access point.

The client device 110 refers to any device that may communicate with the local area network 108 and router 106. For example, the client device 110 may be a desktop computer 112, a laptop computer 114, a smartphone 116, a tablet 118, etc. Such devices are well known to those skilled in the art. Accordingly, the local area network 108 may comprise a plurality of client devices 110 that communicate over a network media, such as Ethernet, WIFI, etc.

Example of a Traffic Session

Figure 1A:
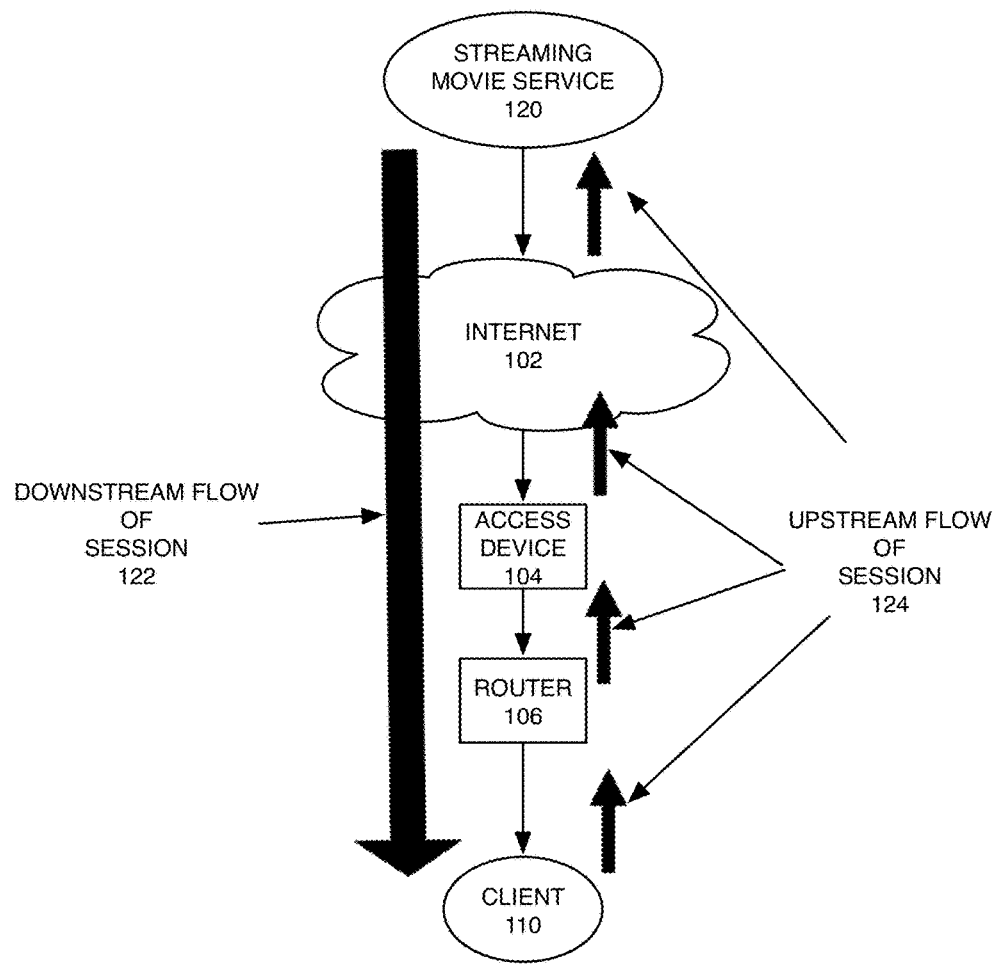
FIG. 1A shows an exemplary traffic session.

FIG. 1A shows an exemplary traffic session. As shown, a streaming movie service 120 may have a traffic session with a client 110 in client network 108 (not shown in FIG. 1A). For example, the streaming movie service 120 may provide content for a video stream in a downstream session flow 122 that originates from the streaming movie service 120 to the client 110. In addition, the traffic session may comprise an upstream flow 124. The upstream flow 124 may comprise, for example, acknowledgment packets and other signaling information that provide information to the move service 120 about the state of the client 110.

For example, the traffic session may employ known protocols, such as UDP, TCP, RTSP, RTP, and RTCP, to send streaming data between the movie service 120 and the client 110. In order to display the content, the client 110 may utilize a client application, such as Flash, Silverlight, or HTML5.

Exemplary Router

Figure 2:
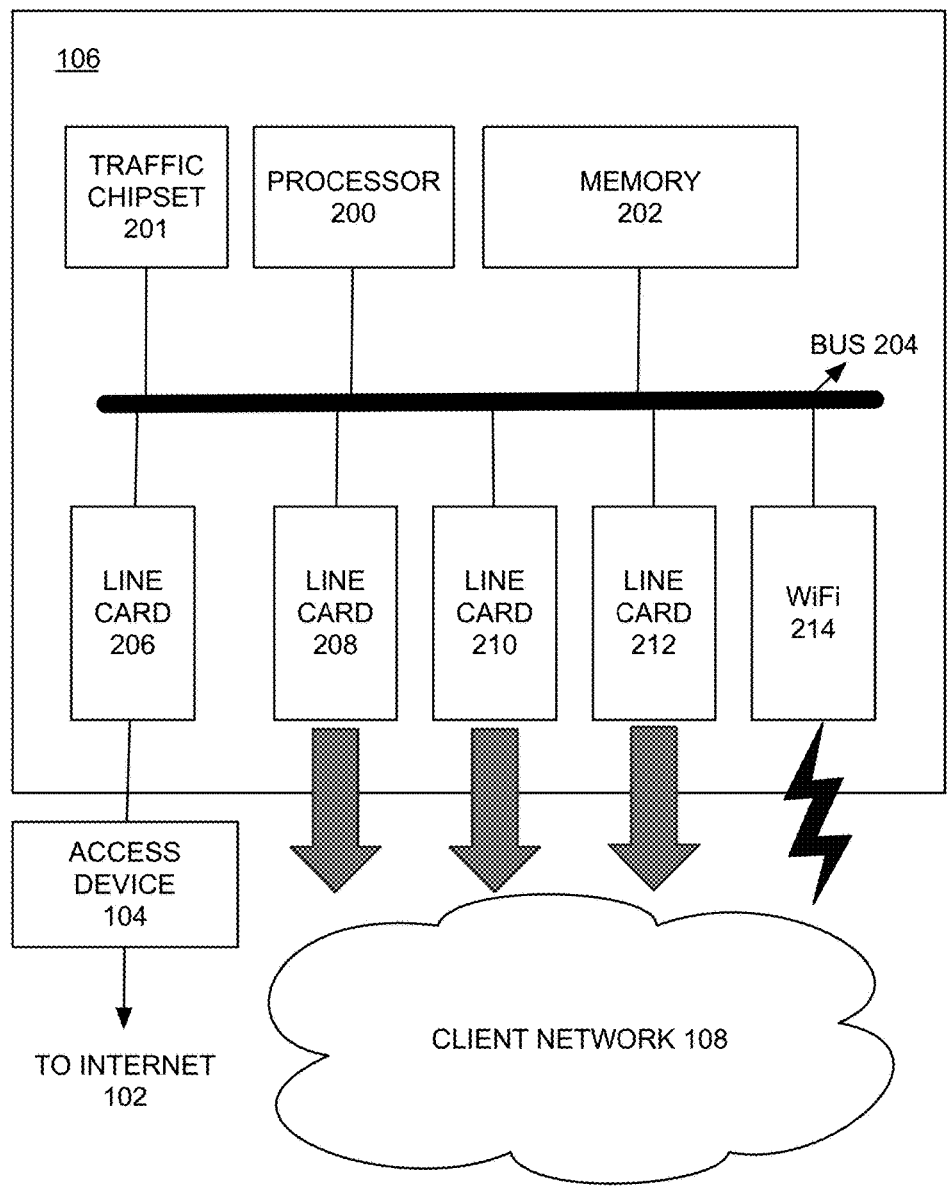
FIG. 2 shows an exemplary router in accordance with some embodiments of the present invention.

FIG. 2 shows an exemplary router in accordance with some embodiments of the present invention. In general, the router 106 may comprise a set of network interfaces, an internal communications system (such as a bus or a switch fabric), and one or more processors. Various architectures for routers are known to those skilled in the art, such as bus-based architectures and switch-based architectures. For purposes of illustration, a bus-based architecture is described for the router 106.

As shown, the router 106 may comprise a controller or processor 200 with a traffic chipset 201, a memory 202, a bus 204, line cards 206, 208, 210, 212, and 214. These components will now be further described below.

The processor 200 comprises the hardware and logic components to perform the routing functions of the router 106. In some embodiments, the processor 200 may be implemented using well-known components, such as a general-purpose central processing unit. Packets arriving at line cards 206, 208, 210, 212, and 214 are forwarded to the processor 200 via the bus 204. The processor 200 then processes the packets and determines a next hop for the packets. The processor 200 moves packets from one line card interface, for example, via a shared memory 202.

The traffic chipset 201 supplements the processing capability of the processor 200 and provides for real-time analysis of the data traffic. In some embodiments, the traffic chipset 201 is configured to monitor the data traffic, and in real-time, recognize traffic sessions in the data traffic and route the packets for these traffic sessions with a desired QOS. The traffic chipset 201 may be implemented using known circuitry and hardware, such as an application-specific integrated circuit. Operations of the traffic chipset 201 are described further below with reference to FIGS. 2-3 and 5.

The memory 202 provides a storage location for the data packets during processing by the router 106. In some of the embodiments shown, the memory 202 is a shared memory. The memory 202 also provides a storage location for other information used by the processor 200. For example, the memory 202 may store a route table, a traffic session table to indicate known traffic sessions, and a session data table to track the progress and state of a traffic session. This data is further described with reference to FIG. 3.

Bus 204 provides a communications medium for the components of router 106. For example, in some embodiments, bus 204 may be implemented as a PCMCIA bus. Typically, in order to move packets from one line card interface to another, the processor 200 may store the packet temporarily in memory 202 and move the packets over bus 204. As noted, in other embodiments, the router 106 may comprise a switch fabric in place of a common bus.

The line cards 206, 208, 210, 212, and 214 provide an interface to the different networks connected via the router 106. For example, as shown line card 206 is connected to the access device 104 for communications with the wide area network 102. Likewise, line cards 208, 210, and 212 provide communications with the local area network 108 and client devices 110. In addition, the router 106 may comprise a wireless interface 214, such as WIFI interface, to provide wireless communications within the local area network 108. In some embodiments, the line cards 206, 208, 210, 212, and 214 may comprise a cache or small memory (not shown) to store a portion of the route table in an attempt to expedite the processing of processor 200.

Exemplary Router Architecture

Figure 3:
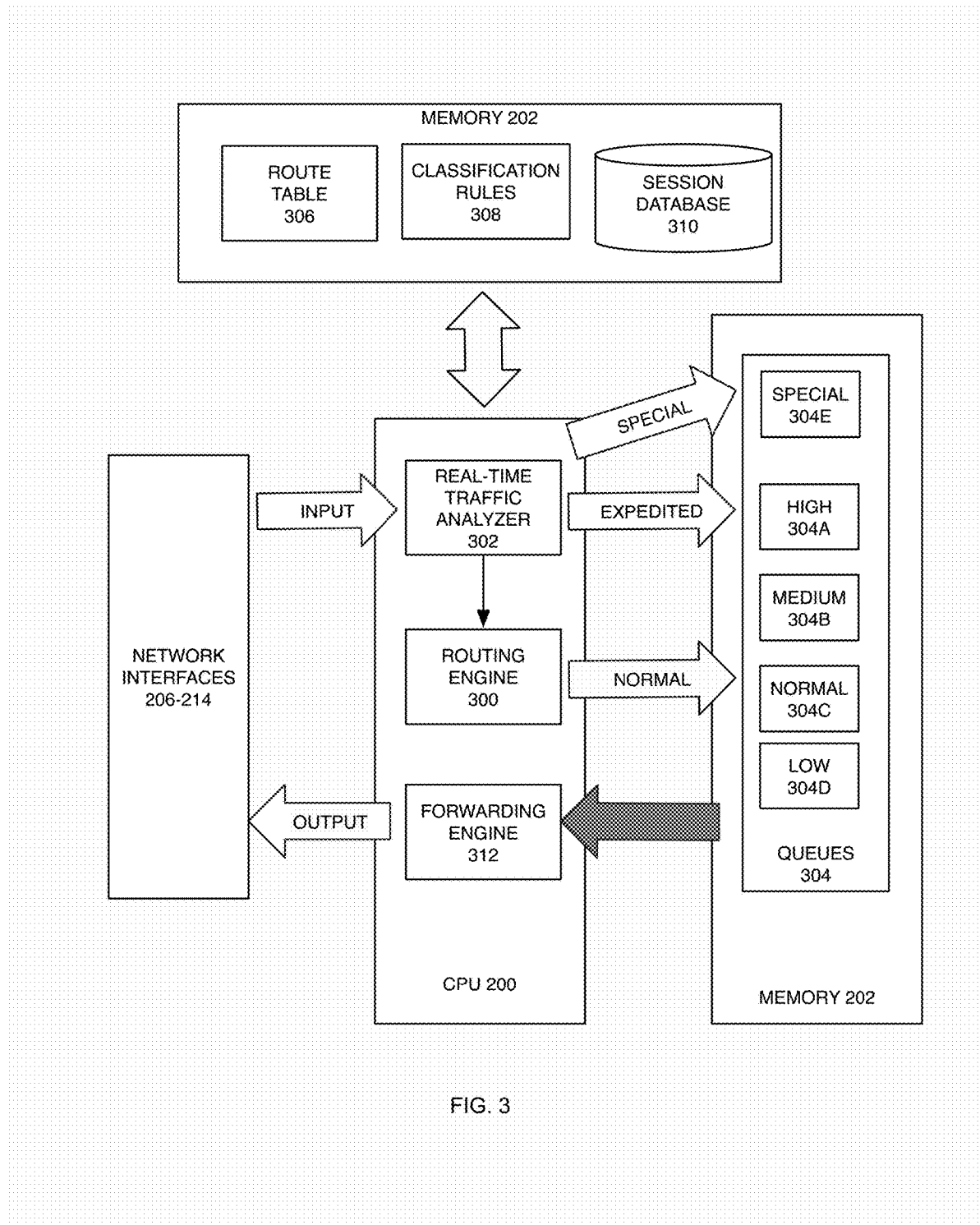
FIG. 3 shows an exemplary functional architecture in accordance with some embodiments of the present invention.

FIG. 3 shows an exemplary functional architecture in accordance with some of the embodiments of the present invention. As shown, the CPU 200 of the router 106 may implement a routing engine 300, a real-time traffic analyzer 302, and a forwarding engine 312. In memory 202, a set of queues 304 are implemented. For example, queues 304 may comprise high priority queue 304A, a medium priority queue 304B, a normal priority queue 304C, and a low priority queue 304D. In addition, memory 202 may comprise a route table 306, a set of classification rules 308, and session database 310. These components will now be further described below.

Routing engine 300 runs on processor 200, and in some embodiments, provides routing services and routing support for TCP/IP data packets. The routing engine 300 may be implemented as software or firmware that runs as executable program code on processor 200. As noted above, the routing engine 300 performs routing on a packet-by-packet basis. For example, the routing engine 300 is configured to read the header of a data packet, perform a route lookup, and then queue the data for the appropriate outbound network interface. Various routing engines are well known to those skilled in the art.

Real-time traffic analyzer 302 performs real-time, session-based analysis for the router 106. The real-time traffic analyzer 302 may be implemented as software or firmware that runs on traffic chipset 201 in processor 200. Alternatively, the real-time traffic analyzer 302 may be a co-processor, application-specific integrated circuit, chipset, etc. that accompanies the processor 200 as a separate component.

In some embodiments, the real-time traffic analyzer 302 is invoked only during periods of congestion. For example, during operation, the processor 200 may be programmed to measure congestion on either of wide area network 102 or local area network 108. Congestion may be detected in a variety of ways, such as explicit congestion notification by one or more devices within networks 102 or 108.

Alternatively, the real-time traffic analyzer 302 may monitor the data traffic for the onset of packet drops by wide area network 102 or client network 108. Alternatively, in periods of low or no congestion, the routing engine 300 may be active while the real-time traffic analyzer 302 is placed in a dormant state. However, when congestion exceeds a threshold or has been detected, the processor 200 of router 106 may activate the real-time traffic analyzer 302.

When active, the real-time traffic analyzer 302 may work in parallel with the routing engine 300. As noted, the real-time traffic analyzer 302 may assist the routing engine 300 in various ways alone or in combination. First, the traffic analyzer 302 may measure various aspects of the data traffic and recognize patterns in the data traffic for one or more traffic sessions, such as a video streaming or voice calls. In some embodiments, the traffic analyzer 302 reads and measures the packets as they are received by the line interface cards 206, 208, 210, 212, and 214 and moved to memory 202. The traffic analyzer 302 may perform these measurements so as not to substantially delay or interfere with the receipt and routing of the packets. For example, the traffic analyzer 302 may selectively copy certain portions of the packet and/or perform various counts and calculations from the packet's header and payload. Measurements, such as data rate in Kbps, interval in milliseconds from a previous packet in the traffic session, and size of the packet are just some of the measurements that may be performed by the traffic analyzer to recognize or identify a traffic session. The traffic analyzer 302 may recognize traffic sessions based on data rate, packet size, packet sequences, bandwidth behavior, and packet exchanges in either upstream or downstream direction, etc. For example, a sample pattern for a video call is provided with reference to FIG. 3B, which is further described below.

Second, once a traffic session has been identified, the traffic analyzer 302 may provide session-based routing services that ensure the desired QOS of the traffic session. For example, in some embodiments, the real-time traffic analyzer 302 is configured to identify or label a traffic session based on reading predetermined portions of the headers of packets as they are received. Once identified, the traffic analyzer 302 can classify the packet in real-time based on classification rules 308. If a match is found, the real-time traffic analyzer 302 copies the data packet to one of queues 304 in memory 202.

In addition, third, the real-time traffic analyzer 302 may track the packets within a traffic session in session database 310. This feature allows the real-time traffic analyzer 302 to be aware of the state of a traffic session and to make session-based analysis. In some embodiments, the real-time traffic analyzer 302 may notify the routing engine 300 that a data packet was routed based on session-based analysis and that route lookup is no longer necessary. In other words, this effectively truncates or abbreviates the normal routing process.

If a match is not found, then real-time traffic analyzer 302 may notify the routing engine 300 so that it continues with its packet-by-packet analysis. For example, as noted above, the routing engine 300 may perform a route lookup in route table 306. Such route lookup algorithms are well-known to those skilled in the art.

Queues 304 provide a temporary storage for packets as they await forwarding out of one line interface cards 206, 208, 210, 212, and 214. As shown, the queues 304 may be configured in memory 200 according to a hierarchy of priorities. For example, the queues 304 may comprise a high priority queue 304A, a medium priority queue 304B, a normal priority queue 304C, and a low priority queue 304D. Of course, the queues 304 may comprise any number of queues. The priority queues 304A-D may further comprise any number of sub-queues.

In addition, to ensure real-time response of the router 106, a special queue 304E may be configured. In some embodiments, the real-time traffic analyzer 302 exclusively places packets in special queue 304E for various traffic sessions present in the traffic. Alternatively, the special queue 304E may be used by either of routing engine 300 or traffic analyzer 302. However, in most circumstances, the traffic analyzer 302 will have priority access to reading and writing to the special queue 304E.

In addition, in some embodiments, the traffic analyzer 302 may be provided an expedited or special access to bus 204 to accelerate its access to any of queues 304. For example, the traffic analyzer 302 may have its own communication channel to queues 304 or may have priority access to the bus 204.

In some of the embodiments, the routing engine 300 and real-time traffic analyzer 302 move packets into one of the queues 304 once their destination has been determined. As noted above, the routing engine 300 determines the next hop of a packet based on performing a lookup in route table 306. The various algorithms for route lookup are well-known to those skilled in the art.

In contrast, as noted above, the real-time traffic analyzer 302 determines the next hop of a packet belonging to a traffic session, such as a voice call, or video stream, using real-time, session-based analysis. In some embodiments, the real-time traffic analyzer 302 moves packets in an expedited fashion into queues 304 based on the session-based analysis. In other words, by using session-based analysis, the real-time traffic analyzer 302 is able to move packets into one of queues 304 faster than a comparable route lookup by routing engine 300.

Route table 306 provides a data structure that lists the routes to a particular destination on either of wide area network 102 or client network 108. The construction and fields of the route table 306 are well-known to those skilled in the art. For example, the route table 306 may indicate a network address on the destination network, a mask, a cost metric for the route through which the packet is to be routed, and the address of the next hop of the packet. The route table 306 may also comprise a quality of service associated with a route, a pointer to filtering criteria or access controls, and a pointer to one of line interface cards 206, 208, 210, 212, or 214.

Classification rules 308 provides a set of rules to identify traffic sessions having a desired QOS and forwarding information that are to be recognized by the real-time traffic analyzer 302. The classification rules 308 may be programmed to provide QOS for various known services. For example, the classification rules 308 may list known traffic sessions from services, such as Netflix, HuluPlus, Cinemallow, Pandora, YouTube, Skype, and Spotify.

The classification rules 308 may be statically written in a reserved portion of memory 202. This allows the real-time traffic analyzer 302 to quickly recognize these traffic services and prioritizes these services to ensure they get the proper bandwidth. In some of the embodiments, the user may also program their own traffic services and QOS parameters into classification rules 308.

Session database 310 provides a database that tracks the progress of a traffic session. For example, the real-time traffic analyzer 302 may track application layer sessions, a session initiation protocol session, a TCP/UDP session, etc. for any of the traffic sessions traveling through router 106. The state information for a session may be various forms, such as cookies, tokens, and various identifiers that are passed between the source and the destination of the traffic session.

Forwarding engine 312 identifies the outgoing interface for packets routed by router 106. For example, the forwarding engine 312 may request various packets from queues 304 to one of line card interfaces 206, 208, 210, 212, or 214 as the output of the packet. In some embodiments, the packet is copied by the processor 200 and written into a cache in one of the line card interfaces 206, 208, 210, 212, or 214 using bus 204.

The forwarding engine 312 may retrieve packets from queues 304 according to various scheduling algorithms. For example, the forwarding engine 312 may employ first in first out, random early detection, weighted fair queuing, etc. to schedule how packets are forwarded from their respective queues 304.

Real-Time Analysis for Recognizing Traffic Sessions

Figure 3A:
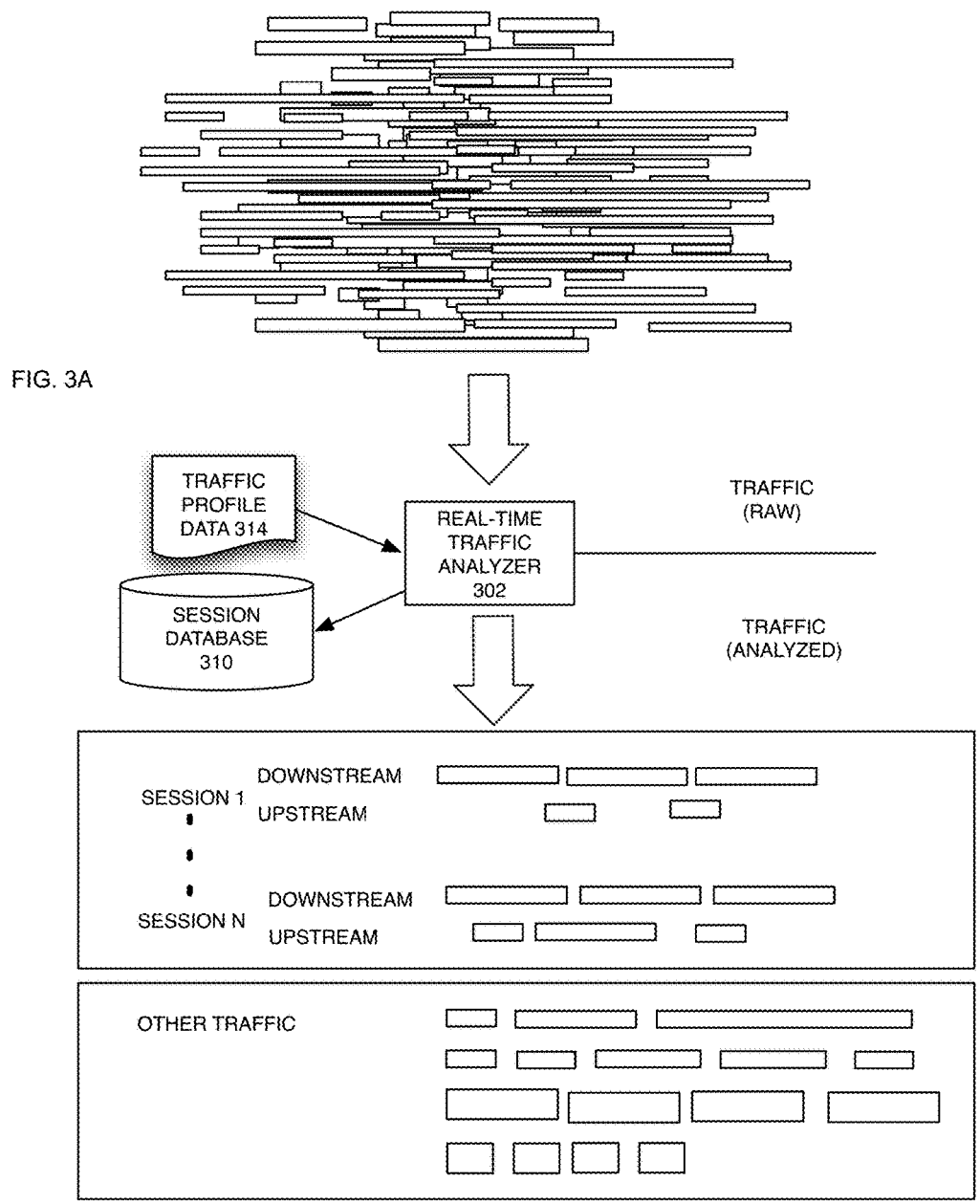
FIG. 3A conceptually illustrates the real-time analysis of a traffic analyzer in accordance with some embodiments of the present invention.

FIG. 3A conceptually illustrates the real-time analysis of a traffic analyzer in accordance with some of the embodiments of the present invention. As shown, as raw data traffic traverses through the router 106, the real-time traffic analyzer 302 will perform various measurements, such as data rate, inter-packet intervals, bandwidth, etc. from the packets. Based on these measurements, the traffic analyzer 302 may refer to profile information 314 to determine if any of the measurements correlate to a known pattern for a traffic session.

Profile information 314 may be stored in memory 202. The profile information 314 may be pre-programmed into router 106. Alternatively, the profile information 314 may be dynamically programmed into router 106 based on historical data measured by the traffic analyzer. In addition, the profile information 314 may be updated by router 106 at various times, such as periodically or upon request. The sources of the updates to the profile information 314 may originate, for example, from one or more sites on the wide area network 102.

As noted above, the traffic analyzer 302 may recognize various patterns of data traffic for any type of traffic session, such as video streaming, web browsing, a voice call, a file transfer, etc. In some embodiments, the traffic analyzer 302 is configured to recognize packets flowing in both downstream and upstream directions for a traffic session.

Figure 3B:
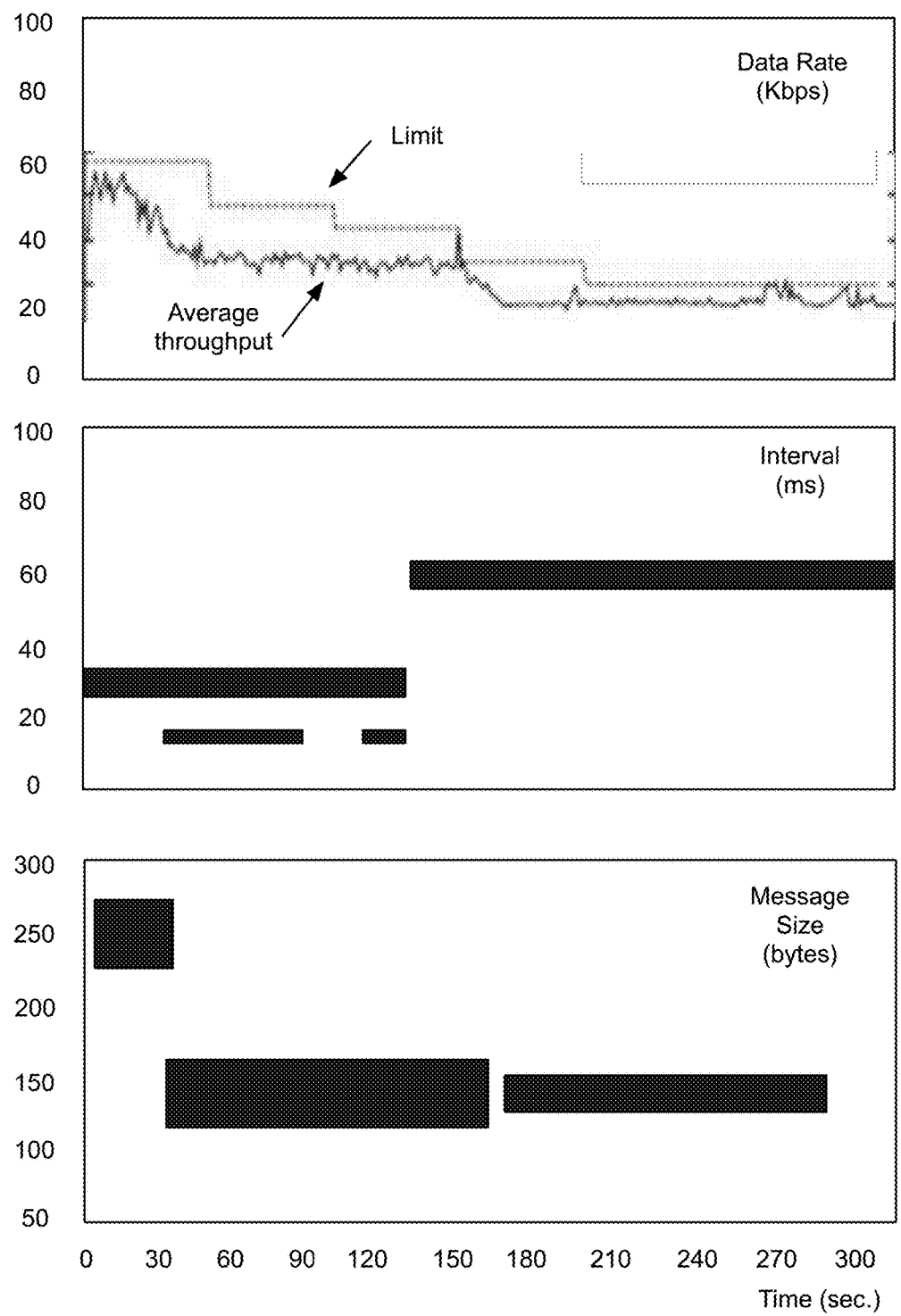
FIG. 3B illustrates an exemplary pattern of a video call that may be employed in some embodiments of the present invention.

For purposes of illustration, an exemplary pattern for a video call is illustrated in FIG. 3B. As shown, a video call may exhibit distinct patterns with respect to packet size over time, intervals between packets, and throughput. Accordingly, the traffic analyzer 302 may comprise logic that measures the packets as they are received by the router 106 and compares these measurements to the various patterns stored in profile data or information base 314. The traffic analyzer 302 may utilize one or more analysis windows to identify or recognize various traffic sessions.

The measurements and calculations of the traffic analyzer 302 may perform on a time-domain or frequency domain basis. For example, the traffic analyzer 302 may employ a Fast-Fourier transform on measurements from the packets in the data traffic to determine data rates, frequency of intervals, etc.

Once the traffic analyzer 302 recognizes a traffic session, it may determine identification information about the traffic session, for example, based on information from the packets' headers, such as the source and destination addresses, MAC addresses, port numbers, etc. In some embodiments, the real-time traffic analyzer 302 may identify a traffic session based on a variety of criteria including, but not limited, a source address on wide area network 102, a destination address, a port number, a type of service bit, and other information from the packet and its header.

In addition, the traffic analyzer 302 is configured to anticipate the progress and state of a traffic session. For example, within a traffic session, the source and destination of the session may pass signaling information, such as cookies, or keys, to indicate transition from one state to another for the traffic session. Accordingly, the traffic analyzer 302 is programmed to support or ensure the proper function of the traffic session for its given state. The traffic analyzer 302 may also anticipate or predict the behavior of traffic sessions based on information in the pattern table 312, session data 310, etc. For example, as shown in FIG. 3A, the traffic analyzer 302 may continuously measure, monitor, and track the various traffic sessions by making entries in session database 310.

Router Queuing

Figure 4:
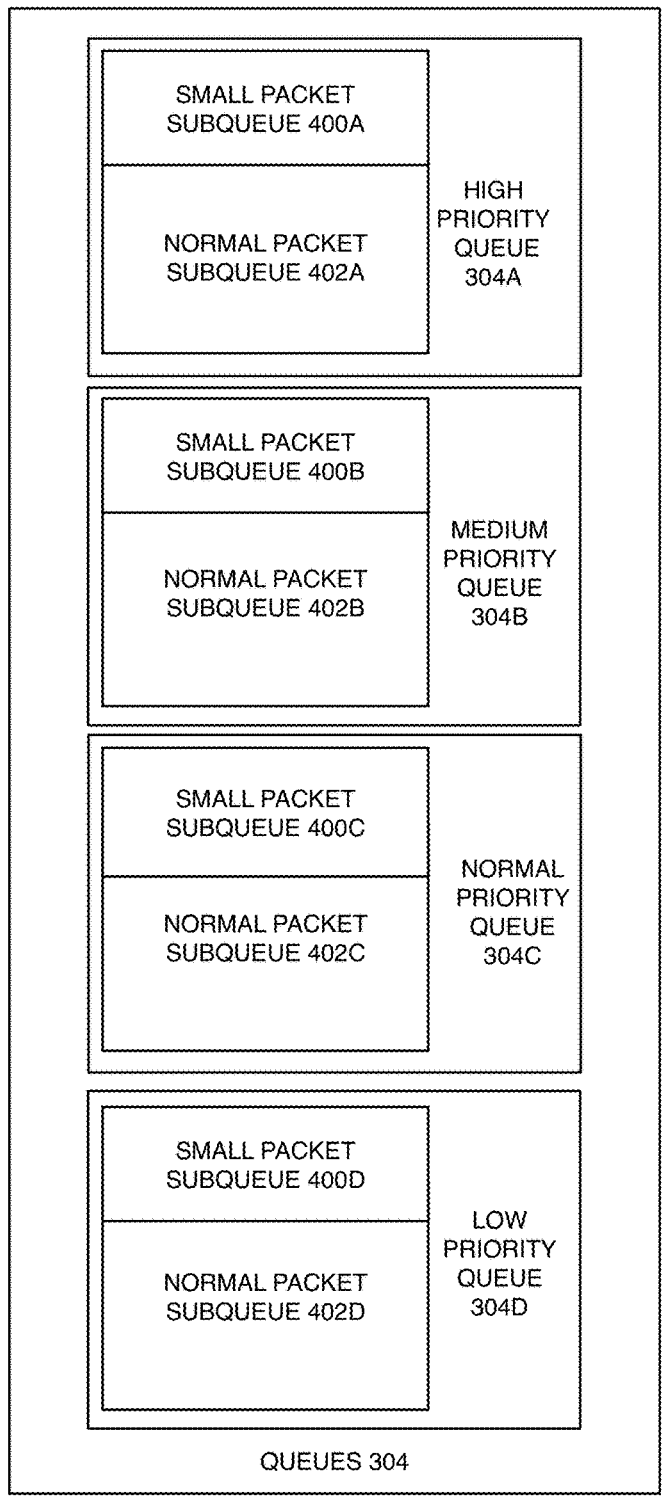
FIG. 4 shows an exemplary set of queues in accordance with some embodiments of the present invention.

FIG. 4 shows an exemplary set of queues in accordance with some embodiments of the present invention. As shown, each priority queue may comprise respective subqueues 400A-D and 402A-D. In some embodiments, one of the subqueues are provided for small packets while a second subqueue is provided for other packets. For example, in one embodiment, subqueues 400A-D are allocated for packets having a relatively small size, such as less than 100 bytes. Such a queue may be useful to ensure routing of signaling traffic upstream.

Normal subqueues 402A-D may be for queuing other types of traffic including best-effort traffic and priority traffic. The normal subqueues 402A-D may be configured with various sizes or depths depending on the available storage space in memory 202.

Exemplary Process Flow

Figure 5:
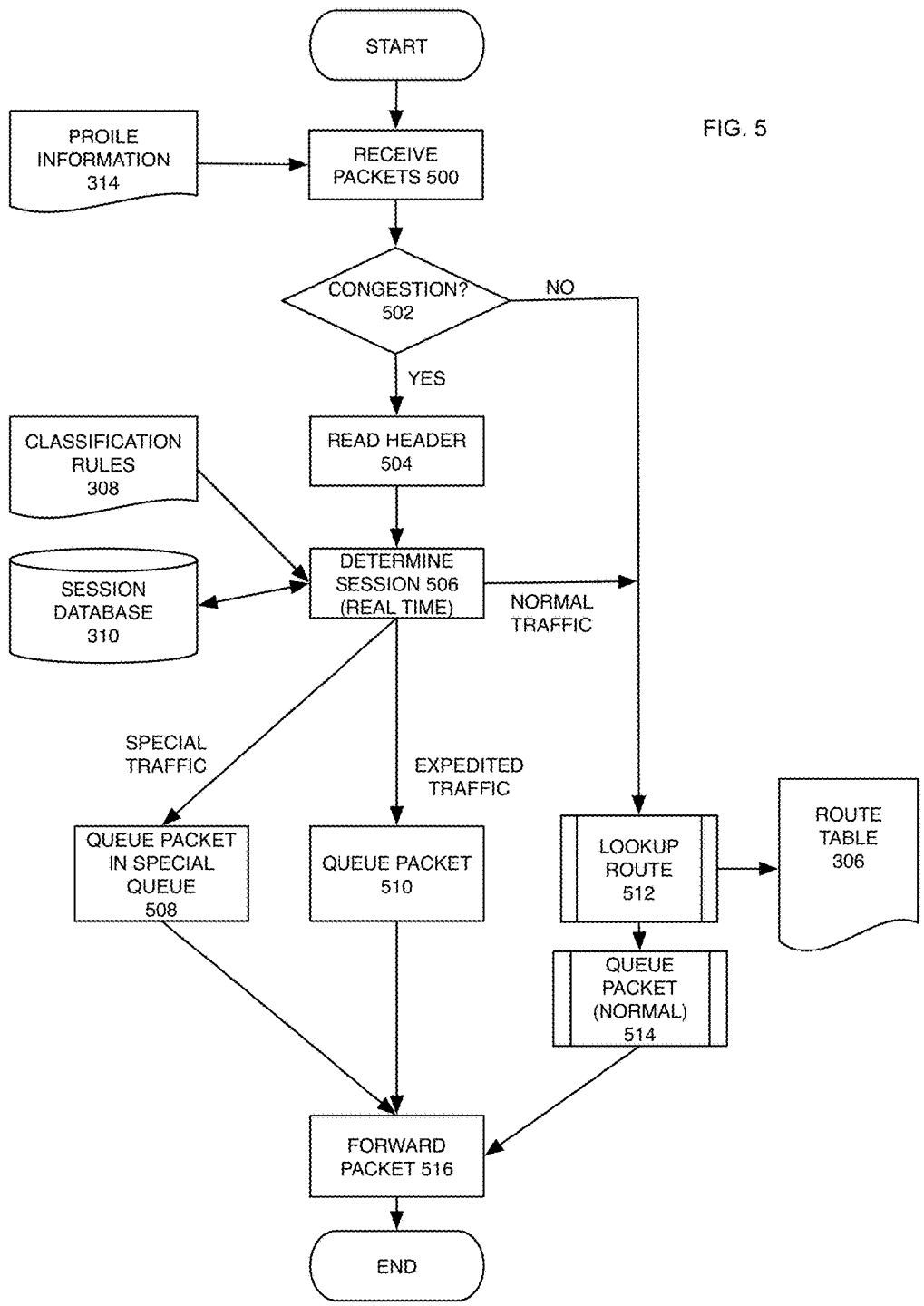
FIG. 5 shows an exemplary process flow in accordance with some embodiments of the present invention.

FIG. 5 shows an exemplary process flow in accordance with some embodiments of the present invention. Of note, in some of the embodiments, the QOS features that can be provided by the router 106 are autonomous and do not require user intervention. For example, in contrast to convention QOS schemes, the router 106 may improve the QOS and throughput of certain traffic sessions without needing the cooperation of other network elements. Furthermore, the router 106 may provide these enhanced QOS features without requiring user input or intervention. For example, as described below, the router 106 may comprise a real-time traffic analyzer that automatically recognizes various traffic sessions automatically. The traffic analyzer may employ various classification rules that are provided to the router 106 in various ways and updated automatically or upon request by the user (if desired). One exemplary process flow explaining how the router 106 can provide real-time, session-based routing for improved QOS will now be explained.

In stage 500, the router 106 receives various packets from data traffic traveling across wide area network 102 and client network 108. For example, in line cards 206, 208, 210, 212, and 214, the received packets are checked for validity and errors and then placed in memory 202. The line cards 206, 208, 210, 212, and 214 may then notify the processor 200, for example, via an interrupt. The interrupt comprises the address in memory 202 for the packet for retrieval by the processor 200.

In addition, during stage 500, the traffic analyzer 302 of the router 106 may be analyzing the received packets and attempting to identify various patterns in this traffic. For example, in some embodiments, as the line cards 206, 208, 210, 212, and 214 are moving packets into memory 202, the traffic analyzer 302 may measure the packets and employ various signal processing algorithms to calculate parameters, such as data rate, bandwidth, inter-packet intervals or frequency, etc., from the packets as they are received into the router 106.

As noted above, in this stage, the traffic analyzer 302 is focused on measuring the packets and recognizing patterns in the data traffic, and thus, does not need to interpret the routing information of the packet's header. That is, the traffic analyzer 302 does not perform the time consuming tasks of routing lookups or packet classification at this time. Instead, the traffic analyzer 302 may refer to profile information 314 to assist in recognize any traffic sessions based on their known patterns. Thus, in accordance with this feature in some of the embodiments, traffic analyzer 302 performs these measurements in real-time or simultaneously without delaying the receipt of the packets.

If a traffic session is recognized, the traffic analyzer 302 may perform various functions to identify that traffic session. For example, the traffic analyzer 302 may record one or more fields of the packet's header, such as its source or destination address, port number, etc. for later use. Alternatively, the traffic analyzer 302 may request that the processor 200 temporarily cache the packet or certain information from the header of the packet so that it can be correlated with the traffic session. Furthermore, the traffic analyzer 302 may make one or more entries in session database 310.

In stage 502, the router 106 determines whether congestion is currently present in either of the networks. This process may be performed as a background process in conjunction with the other routing processes performed by router 106. As noted, depending on the congestion, the router 106 will route packets differently. If congestion is considered present or above a threshold, then the router 106 will employ session-based analysis to assist in routing packets by proceeding to stage 504. However, if congestion is not present or below a threshold, then the router 106 will route packets normally by proceeding to stage 514. Both of these modes of routing will be described below.

If congestion is present, then the router 106 may employ real-time traffic analyzer 302 for session-based analysis of the packets first. In particular, in stage 504, the real-time traffic analyzer 302 may read the packet from memory 202 based on the address indicated in the interrupt. In some embodiments, the real-time traffic analyzer 302 is configured to only read selected portions of the header of the packet, such as the destination address and port number. For example, the real-time traffic analyzer 302 may be configured to one or more offsets to skip to the relevant portions of the header.

In stage, in stage 506, the real-time traffic analyzer 302 determines from the header portions whether the packet is part of a known session. In some embodiments, the traffic analyzer 302 has previously recognized the presence of a traffic session based on analysis of the packets as they are received. For example, the real-time traffic analyzer 302 may compare the portions from the header to one or more entries in the classification rules 308 and/or session database 310. In addition, the real-time traffic analyzer 302 may perform one or more lookups in session database 310 to determine a current state of a traffic session. In order to expedite this matching process, the real-time traffic analyzer 302 may user various techniques such as bit masks, prefix matching, hashing, or keys, to lookup matches in the classification rules 308 and session database 310. The real-time traffic analyzer 302 also records information in session database 310 to track the state of the traffic session as new packets for a traffic session are received and processed.

If the packet is part of a known session, then in stage 508, the real-time traffic analyzer 302 will determine a priority for the packet and forwarding information based on the session to which it belongs and proceed to stage 510. However, if the packet is not part of known session, the router 106 will proceed to a conventional routing technique, which is described further below with reference to stage 514.

In stage 510, the real-time traffic analyzer 302 will queue the packet in one of priority queues 304 for forwarding to its next hop. In some embodiments, one or more fields in the classification rules 308 may indicate the priority for the packet and the forwarding information needed. Alternatively, the real-time traffic analyzer 302 may assign a priority to the packet based on characteristics of the traffic session. For example, traffic sessions for all packets of VoIP calls may be assigned a high priority due to their QOS requirements, whereas downstream flow packets for video streaming services, such as Netflix, may be assigned medium priority. However, upstream packets for video streaming services may be assigned a high priority. Any of a wide variety of prioritization schemes may be used in some of the embodiments. Once the priority for the packet has been determined, the real-time traffic analyzer 302 may write the packet in one of queues 304 and record the address of the packet in memory 202. The real-time traffic analyzer 302 may also record information in session database 310 to track the state of the traffic session.

In some embodiments, the real-time traffic analyzer 302 is provided an expedited path over bus 204 to accelerate placement of the packets in the queues 304, especially queue 304E. This ensures that the traffic analyzer 302 can process and forward packets within a real-time constraint. For example, the real-time traffic analyzer 302 may have priority access to bus 204 relative to routing engine 300. Alternatively, the real-time traffic analyzer 302 may be provided its own or a special channel to memory 202 and the queues 304, especially queue 304E. Any expedited path to the queues 304 may be implemented by some of the embodiments.

In some embodiments, the real-time traffic analyzer 302 notifies the routing engine 300 that the packet has been matched to a traffic session. In response, the routing engine 300 will proceed to processing of the next appropriate packet.

In stage 512, the router 106 forwards the packet to its next hop. In particular, when a packet is placed in one of queues 304, the processor 200 schedules a forwarding process by forwarding engine 312, for example, via an interrupt with the address in memory 202 of the queued packet. In response, the forwarding engine 312 will read a packet from queues 304 and perform various checks, for example, for errors and validity. The forwarding engine 312 then determines the next hop of the packet. As noted, since the packet was part of a known traffic session, the real-time traffic analyzer 302 may provide the forwarding information with the packet in queues 304.

In some embodiments, the forwarding engine 312 employs various scheduling algorithms or schemes to determine when to service the queues 304. For example, as noted above, the forwarding engine 312 may be configured to preferentially service small packet sub-queues 400A-D during periods of congestion. In addition, the forwarding engine 312 may be configured to limit upstream best-effort traffic to access device 104 to a maximum threshold, such as 92%.

Based on this forwarding information, the forwarding engine 312 determines the outgoing interface, i.e., one of line of interface cards 206, 208, 210, 212, or 214. In some embodiments, the forwarding engine 312 may maintain a cached forwarding table (not shown) to determine which of line interface cards 206, 208, 210, 212, or 214 to forward the packet. Alternatively, the forwarding engine 312 may send a request, such as an address resolution protocol request, to the line interface cards 206, 208, 210, 212, or 214 to resolve the address of the next hop for the packet.

The forwarding engine 312 may then format the packet for transmission to its next hop on wide area network 102 or client network 108 and moves the packet from the queues 304 to the appropriate line interface cards. For example, the forwarding engine 312 may encapsulate the packet in an Ethernet frame for transmission to access device 104 or client network 108. In addition, the forwarding engine 312 may send an interrupt to processor 200 to indicate that processing of the packet has been completed. This concludes the session-based mode of routing a packet.

Returning now to normal packet-based mode of routing a packet, in stage 514, the router 106 lookups up a route from the route table 306. For example, if the real-time traffic analyzer 302 was unable to match the packet to a known traffic session, then the real-time traffic analyzer 302 may notify the routing engine 300 of this event. Alternatively, in some embodiments, the real-time traffic analyzer 302 is limited by a fixed timer and notifies the routing engine 300 after this timer has elapsed of its result. For conventional packet-by-packet routing analysis, the router 106 may proceed to stage 514, which is described further below.

In particular, the routing engine 300 retrieves the packet from memory 202, reads the header of the packet, and performs a route lookup from route table 300. The routing engine 300 may also perform other routing functions. Such route lookup techniques and functions are well known to those skilled in the art.

In stage 516, the router 106 queues the packet in the queues of memory 302. In particular, the routing engine 300 determines the forwarding information for the packet and writes this information to the packet. The routing engine 300 then places the packet in one of queues 304 and sends an interrupt to the processor 200. This interrupt provides the address of the packet in memory 202 and causes the processor 200 to schedule the forwarding process by forwarding engine 312.

Processing then returns to stage 512, where the forwarding engine 312 performs its process to forward the packet to its next hop. As noted above, the forwarding engine 312 may implement various scheduling algorithms, such as first in first out, random early detection, weighted fair queuing, etc., to determine when to service queues 304.

Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A router comprising:
   an internal communications facility;
   a set of network interfaces coupled to the internal communications facility;
   a shared memory, coupled to the internal communications facility, providing a set of queues; and
   a processor, coupled to the internal communications facility, configured to:
     detect a level of congestion on at least one of the network interfaces;
     responsive to the congestion level being below a threshold level, route packets through the router according to a first mode; and
     responsive to the congestion level being above the threshold level, activate a hardware accelerator and route packets according to a second mode, wherein the hardware accelerator is configured to accelerate placement of packets into the set of queues via an expedited communications path over a bus,
   wherein, in the first mode, the processor is configured to:
     read header information from the packets; and
     route the packets to a next hop based on a route lookup corresponding to the header information, and
   wherein, in the second mode, the processor is configured to:
     cooperate with the hardware accelerator to detect, in real time, sessions in data traffic based on information from portions of the headers in the packets and a current state of a traffic session, wherein the current state of the traffic session is based on packets previously exchanged downstream or upstream between a source and a destination of the traffic session;
     queue packets that are part of detected sessions based on a size of the packets and a desired quality of service for the session; and
     forward the queued packets that belong to the traffic sessions in accordance with the desired quality of service.

2. The router of claim 1, wherein the set of network interfaces comprises an Ethernet interface.

3. The router of claim 1, wherein the set of network interfaces comprises a wireless network interface.

4. The router of claim 1, wherein the set of queues comprises a respective subqueue at a top of a queue allocated for packets that are smaller than a threshold size.

5. The router of claim 1, wherein, in the second mode, the processor is further configured to limit best-effort traffic traveling upstream to a wide area network below a threshold bandwidth.

6. The router of claim 1, wherein the hardware accelerator comprises a chipset coupled to the processor to perform instructions within a real-time constraint.

7. The router of claim 6, wherein the hardware accelerator further comprises the expedited communications path for transferring packets to the set of queues.

8. The router of claim 7, wherein the set of queues comprises a special queue reserved for packets designated by the hardware accelerator.

9. A method, comprising:
   detecting a level of congestion on at least one network interface;
   responsive to the congestion level being below a threshold level:
     reading header information from packets received via the at least one network interface; and
     routing the packets to a next hop based on a route lookup corresponding to the header information; and
   responsive to the congestion level being above the threshold level:
     activating a hardware accelerator, wherein the hardware accelerator is configured to accelerate placement of packets into a set of queues via an expedited communications path over a bus;
     detecting, in real time, sessions in data traffic based on information from portions of the headers in the packets and a current state of a traffic session, wherein the current state of the traffic session is based on packets previously exchanged downstream or upstream between a source and a destination of the traffic session;
     queuing packets that are part of detected sessions based on a size of the packets and a desired quality of service for the session; and
     forwarding the queued packets that belong to the traffic sessions in accordance with the desired quality of service.

10. The method of claim 9, wherein the at least one network interface comprises an Ethernet interface.

11. The method of claim 9, wherein the at least one network interface comprises a wireless network interface.

12. The method of claim 9, wherein the set of queues comprises a respective subqueue at a top of a queue allocated for packets that are smaller than a threshold size.

13. The method of claim 9, further comprising:
   responsive to the congestion level being above the threshold level, limiting best-effort traffic traveling upstream to a wide area network below a threshold bandwidth.

14. The method of claim 9, wherein the hardware accelerator comprises a chipset coupled to a processor to perform instructions within a real-time constraint.

15. The method of claim 9, wherein the hardware accelerator comprises the expedited communications path for transferring packets to the set of queues.

16. The method of claim 9, wherein the set of queues comprises a special queue reserved for packets designated by the hardware accelerator.

17. A non-transitory computer-readable medium having stored thereon instructions that, when executed by a processor, cause the processor to perform operations comprising:
   detecting a level of congestion on at least one network interface;
   responsive to the congestion level being below a threshold level:
     reading header information from packets received via the at least one network interface; and
     routing the packets to a next hop based on a route lookup corresponding to the header information; and
   responsive to the congestion level being above the threshold level:
     activating a hardware accelerator, wherein the hardware accelerator is configured to accelerate placement of packets into a set of queues via an expedited communications path over a bus;

detecting, in real time, sessions in data traffic based on information from portions of the headers in the packets and a current state of a traffic session, wherein the current state of the traffic session is based on packets previously exchanged downstream or upstream between a source and a destination of the traffic session;

queuing packets that are part of detected sessions based on a size of the packets and a desired quality of service for the session; and forwarding the queued packets that belong to the traffic sessions in accordance with the desired quality of service.

18. The non-transitory computer-readable medium of claim 17, wherein the operations further comprise:

responsive to the congestion level being above the threshold level, limiting best-effort traffic traveling upstream to a wide area network below a threshold bandwidth.

19. The non-transitory computer-readable medium of claim 17, wherein the hardware accelerator comprises one or more of a chipset coupled to the processor to perform instructions within a real-time constraint or the expedited communications path for transferring packets to the set of queues.

20. The non-transitory computer-readable medium of claim 17, wherein the set of queues comprises a special queue reserved for packets designated by the hardware accelerator.

* * * * *